(12) United States Patent
Delgado et al.

(10) Patent No.: US 11,544,774 B1
(45) Date of Patent: Jan. 3, 2023

(54) METHOD, APPARATUS, AND COMPUTER PROGRAM PRODUCT FOR DEVICE RENDERED OBJECT SETS BASED ON MULTIPLE OBJECTIVES

(71) Applicant: Groupon, Inc., Chicago, IL (US)

(72) Inventors: Joaquin Delgado, Santa Clara, CA (US); Samuel Lind, Santa Clara, CA (US); Carl Radecke, Santa Clara, CA (US); Bhavani Satish, Santa Clara, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 17/001,500

(22) Filed: Aug. 24, 2020

Related U.S. Application Data

(60) Provisional application No. 62/891,036, filed on Aug. 23, 2019.

(51) Int. Cl.
*G06Q 30/00* (2012.01)
*G06Q 30/06* (2012.01)
*G06Q 30/02* (2012.01)
*G06K 9/62* (2022.01)
*G06N 20/00* (2019.01)
*H04L 67/04* (2022.01)

(52) U.S. Cl.
CPC ......... *G06Q 30/0643* (2013.01); *G06K 9/623* (2013.01); *G06K 9/6257* (2013.01); *G06N 20/00* (2019.01); *G06Q 30/0224* (2013.01); *G06Q 30/0631* (2013.01); *H04L 67/04* (2013.01)

(58) Field of Classification Search
None
See application file for complete search history.

(56) References Cited

U.S. PATENT DOCUMENTS 9,659,317 B2 * 5/2017 Naghmouchi ..... G06Q 30/0619
10,567,235 B1 * 2/2020 Shah ....................... H04L 41/16
(Continued)

OTHER PUBLICATIONS

Zheng Qin, "Introduction to E-commerce", 2009, Springer, springer.com (Year: 2009).*
(Continued)

*Primary Examiner* — Michelle T Kringen
*Assistant Examiner* — Norman Donald Sutch, Jr.
(74) *Attorney, Agent, or Firm* — Alston & Bird LLP

(57) ABSTRACT

An apparatus, computer program product, and method are provided for predictive recommendations of device rendered objects using one or more objective models. In the context of a method, the method generates, for each device rendered object of a plurality of device rendered objects, a multiple objective score. The method also determines a real-time adjustment factor based in part on a received objective adjustment signal and generates, for each device rendered object of the plurality of device rendered objects, an adjusted multiple objective score based on the real-time adjustment factor. The method also generate a ranked device rendered object set, selects a subset of the ranked rendered object set, and transmits the ranked device rendered object subset to a client device associated with the user object of the user object objective, the subset configured for rendering within the user, interface area of the client device.

17 Claims, 5 Drawing Sheets

(56) References Cited

U.S. PATENT DOCUMENTS

| | | | | |
|---|---|---|---|---|
| 2009/0276309 | A1* | 11/2009 | Otto | G06Q 30/0255 |
| | | | | 706/14 |
| 2014/0122622 | A1* | 5/2014 | Castera | H04L 51/04 |
| | | | | 709/206 |
| 2015/0332313 | A1* | 11/2015 | Slotwiner | G06Q 30/0241 |
| | | | | 705/14.44 |
| 2015/0358766 | A1* | 12/2015 | McDevitt | G06Q 30/0267 |
| | | | | 705/14.58 |
| 2017/0061286 | A1* | 3/2017 | Kumar | G06Q 30/0269 |
| 2018/0350015 | A1* | 12/2018 | Gordon | G06N 20/00 |
| 2018/0356961 | A1* | 12/2018 | Lewis | H04L 65/60 |
| 2020/0410289 | A1* | 12/2020 | Arunmozhi | G06K 9/6256 |

OTHER PUBLICATIONS

PR Newswire; "Netpulse Chooses Sabela Media To Provide Precision Targeting for Advertisements"; Nov. 1, 1999; PR Newswire Association LLC (Year: 1999).*

Adomavicius, G. et al., Context-Aware Recommender Systems, AI Magazine, 67-80, 32(3).

Delgado, Joaquin A. et al., Simple Objectives Work Better, Presented at RMSE Workshop, 13th ACM Conference RecSys, 2019, Copenhagen, Denmark, 7 pages.

Delgado, Joaquin et al., Scalable Recommender Systems: Where Machine Learning Meets Search, In Proceedings of the 9th ACM Conference on Recommender Systems (RecSys 2015), ACM, New York, NY, 365-366.

Embeddings@Twitter, Twitter Engineering, [https://blog.twitter.com/engineering/en_us/topics/insights/2018/embeddingsattwitten.htm], Nov. 23, 2020.

Friedman, Jerome H., Stochastic gradient boosting, Computational Statistics and Data Analysis. 38, 4 (Feb. 2002).

Joaquin A. Delgado, PhD., Scalable Recommender/Advertising Systems, Nov. 16, 2013, YouTube (3 pages), https//www.youtube.com/watch?v=zxYDal1vu-0, Nov. 24, 2020.

Karatzoglou, A. et al., Learning to rank for recommender systems, In proceedings of the 7th AMC conference on RecSys, ACM, New York, NY, 2013, 493-494.

Koehrsen, Will, Unintended Consequences and Goodhart's Law, Feb. 24, 2018, Goodhart's Law, 1-5, [https://towardsdatascience.com/unintended-consequences-and-goodharts-law-68d60a94705c], Nov. 23, 2020.

Koren, Y. et al., Matrix Factorization Techniques for Recommender Systems, Computer 42, 8 (Aug. 2009), 30-37.

Ma, Kevin, Applying Deep Learning to Related Pins, Jan. 12, 2017, Pinterest Engineering, 7 pages, [https://medium.com/the-graph/applying-deep-learning-to-relared-pins-a6fee3c92f5e], Nov. 23, 2020.

Mean Average Precision (MAP), [https://en.wikipedia.org/wiki/Evaluation_measures_(information_retrieval#Mea_average_precision], Nov. 23, 2020.

Normalized Discounted Cumulative Gain (NDCG), [https://en.wikipedia.org/wiki/Discounted_cumulative_gain#Normalized_DCG, Nov. 23, 2020.

Rodriguez, M. et al., Multiple objective optimization in recommender systems, In Proceedings of the 6th ACM conference on Recommender Systems (RecSys 2012), Nov. 23, 2020.

* cited by examiner

300

301 — Programmatically generate, for each device rendered object of a plurality of device rendered objects, a multiple objective score

302 — Determine a real-time adjustment factor based in part on a received objective adjustment signal

303 — Programmatically generate, for each device rendered object of the plurality of device rendered objects, an adjusted multiple objective score

304 — Programmatically generate a ranked device rendered object set comprising a plurality of device rendered objects in an order according to each associated adjusted multiple objective score of each device rendered object

305 — Select a ranked device rendered object subset comprising a subset of the plurality of device rendered objects of the ranked device rendered object set

306 — Transmit the ranked device rendered object subset to a client device associated with a user object of the user object objective

FIG. 3A

METHOD, APPARATUS, AND COMPUTER PROGRAM PRODUCT FOR DEVICE RENDERED OBJECT SETS BASED ON MULTIPLE OBJECTIVES

CROSS REFERENCE TO RELATED APPLICATIONS

This application claims the benefit of U.S. Provisional Application. No. 62/891,036, filed Aug. 23, 2019, and titled "IMPRESSION RELEVANCE PREDICTION AND RECOMMENDATION SYSTEM," which is incorporated by reference herein in its entirety.

TECHNOLOGICAL FIELD

Embodiments of the invention relate, generally, to a predictive recommendation system using one or more objective models and, more particularly, to generating device rendered object sets based on a plurality of objectives associated with a plurality of stakeholders.

BACKGROUND

Generating sets of device rendered objects may be burdensome in situations in which multiple parties have different interests in the device rendered objects. Through applied effort, ingenuity, and innovation, solutions to improve generation of device rendered object sets have been realized and are described in connection with embodiments of the present invention.

BRIEF SUMMARY

In accordance with one aspect, an apparatus is provided. The apparatus comprises at least one processor and at least one memory storing, instructions that, with at least one processor, configure the apparatus to programmatically generate, for each device rendered object of a plurality of device rendered objects, a multiple objective score based at least in part on weighting each score of a plurality of objective scores generated using a plurality of unique objective models each associated with a unique objective of a plurality of objectives, wherein the plurality of objectives comprises at least a user object objective, a transaction object objective, and a device rendered object currency value objective; determine a real-time adjustment factor based in part on a received objective adjustment signal; programmatically generate, for each device rendered object of the plurality of device rendered objects, an adjusted multiple objective score based at least in part on the multiple objective score for the device rendered object and the real-time adjustment factor; programmatically generate a ranked device rendered object set comprising a plurality of device rendered objects in an order according to each associated adjusted multiple objective score of each device rendered object; select a ranked device rendered object subset comprising a subset of the plurality of device rendered objects of the ranked device rendered object set, wherein the ranked device rendered object subset is selected based at least on a predefined size of a user interface area of a client device associated with the a user object of the user object objective; and transmit the ranked device rendered object subset to the client device associated with the user object of the user object objective, the ranked device rendered object subset configured for rendering within the user interface area of the client device.

In some embodiments, the instructions configured to cause the apparatus to determine the real-time adjustment factor are further configured to, with the at least one processor, cause the apparatus to predict, using a reduction utilization model, a utilization of a predefined reduction object associated with the user object for the respective device rendered object, wherein the predefined reduction object is associated with one of an open reduction object available to all user objects of a plurality of user objects or a closed reduction object available only to a subset of user objects of the plurality of user objects; and in accordance with a prediction that the predefined reduction object is to be utilized, adjust the multiple objective score based on the predefined reduction object.

In some embodiments, the reduction utilization model comprises a gradient boosted model. In some embodiments, the instructions are further configured to, with the at least one processor, cause the apparatus to train the reduction utilization model based at least on historical user data associated with the user object in some embodiments, the real-time adjustment factor is associated with an increase in interaction signals associated with a given device rendered object, the interaction signals received from a client device, in some embodiments, the real-time adjustment factor is associated with an increase in electronic currency value data structures generated based in part on interaction signals associated with one or more device rendered objects received from a plurality of client devices. In some embodiments, the plurality of objectives further comprise a user object transformation objective associated with transforming a user object data record associated with a user object from a first interaction signal status to a second interaction signal status.

In another aspect, a computer program product is provided. The computer program product includes a non-transitory computer readable medium having program code portions stored thereon with the program code portions being configured, upon execution, to programmatically generate, for each device rendered object of a plurality of device rendered objects, a multiple objective score based at least in part on weighting each score of a plurality of objective scores generated using a plurality of unique objective models each associated with a unique objective of a plurality of objectives, wherein the plurality of objectives comprises at least a user object objective, a transaction object objective, and a device rendered object currency value objective; determine a real-time adjustment factor based in part on a received objective adjustment signal; programmatically generate, for each device rendered object of the plurality of device rendered objects, an adjusted multiple objective score based at least in part on the multiple objective score for the device rendered object and the real-time adjustment factor; generate a ranked device rendered object set comprising a plurality, of device rendered objects in an order according to each associated adjusted multiple objective score of each device rendered object; select a ranked device rendered object subset comprising a subset of the plurality of device rendered objects of the ranked device rendered object set, wherein the ranked device rendered object subset is selected based at least on a predefined size of a user interface area of a client device associated with the a user object of the user object objective; and transmit the ranked device rendered object subset to the client device associated with the user object of the user object objective, the ranked device rendered object subset configured for rendering within the user interface area of the client device.

In some embodiments, the program code portions configured to cause the apparatus to determine the real-time adjustment factor are further configured to predict, using a reduction utilization model, a utilization of a predefined reduction object associated with the user object for the respective device rendered object, wherein the predefined reduction objects associated with one of an open discount value object available to all user objects of a plurality of user objects or a closed discount value object available only to a subset of user objects of the plurality of user objects; and in accordance with a prediction that the predefined discount value object is to be utilized, adjust the multiple objective score based on the predefined discount value object.

In some embodiments, the reduction utilization model comprises a gradient boosted model. In some embodiments, the program code portions are further configured to train the reduction utilization model based at least on historical user data associated with the user object. In some embodiments, the real-time adjustment factor is associated with an increase in interaction signals associated with a given device rendered object, the interaction signals received from a client device. In some embodiments, the real-time adjustment factor is associated with an increase in electronic currency value data structures generated based in part on interaction signals associated with one or more device rendered objects received from a plurality of client devices. In some embodiments, the plurality of objectives further comprise a user object transformation objective associated with transforming a user object data record associated with a user object from a first interaction signal status to a second interaction signal status.

In another aspect, a computer-implemented method is provided. The computer-implemented method comprises programmatically generating, for each device rendered object of a plurality of device rendered objects, a multiple objective score based at least in part on weighting each score of a plurality of objective scores generated using a plurality of unique objective models each associated with a unique objective of a plurality of objectives, wherein the plurality of objectives comprises at least a user object objective, a transaction object objective, and a device rendered object currency value objective; determining a real-time adjustment factor based in part on a received objective adjustment signal; programmatically generating, for each device rendered object of the plurality of device rendered objects, an adjusted multiple objective score based at least in part on the multiple objective score for the device rendered object and the real-time adjustment factor; programmatically generating a ranked device rendered object set comprising a plurality of device rendered objects in an order according to each associated adjusted multiple objective score of each device rendered object; selecting a ranked device rendered object subset comprising a subset of the plurality of device rendered objects of the ranked device rendered object set, wherein the ranked device rendered object subset is selected based at least on a predefined size of a user interface area of a client device associated with the a user object of the user object objective; and transmitting the ranked device rendered object subset to the client device associated with the user object of the user object objective, the ranked device rendered object subset configured for rendering within the user interface area of the client device.

In some embodiments, determining the real-time adjustment factor further comprises predicting, using a reduction utilization model, a utilization of a predefined reduction object associated with the user object for the respective device rendered object, wherein the predefined reduction objects associated with one of an open discount value object available to all user objects of a plurality of user objects or a closed discount value object available only to a subset of user objects of the plurality of user objects; and in accordance with a prediction that the predefined discount value object is to be utilized, adjusting the multiple objective score based on the predefined discount value object.

In some embodiments, the computer-implemented method further comprises training the reduction utilization model based at least on historical user data associated with the user object. In some embodiments, the real-time adjustment factor is associated with an increase in interaction signals associated with a given device rendered object, the interaction signals received from a client device. In some embodiments, the real-time adjustment factor is associated with an increase in electronic currency value data structures generated based in part on interaction signals associated with one or more device rendered objects received from a plurality of client devices. In some embodiments, the plurality of objectives further comprise a user object transformation objective associated with transforming a user object data record associated with a user object from a first interaction signal status to a second interaction signal status.

BRIEF DESCRIPTION OF THE SEVERAL VIEWS OF THE DRAWINGS

Figure 1:
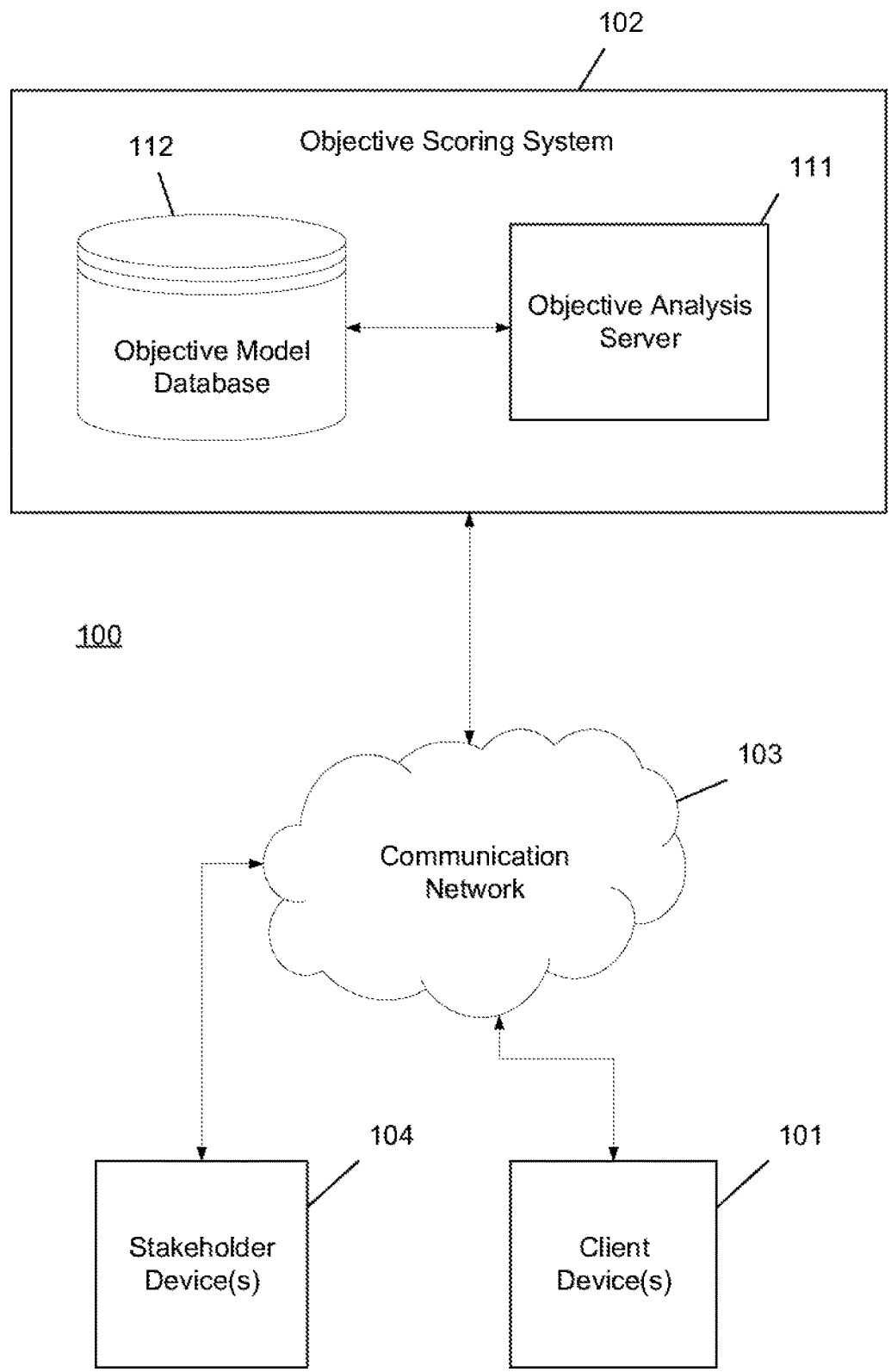
Figure 2:
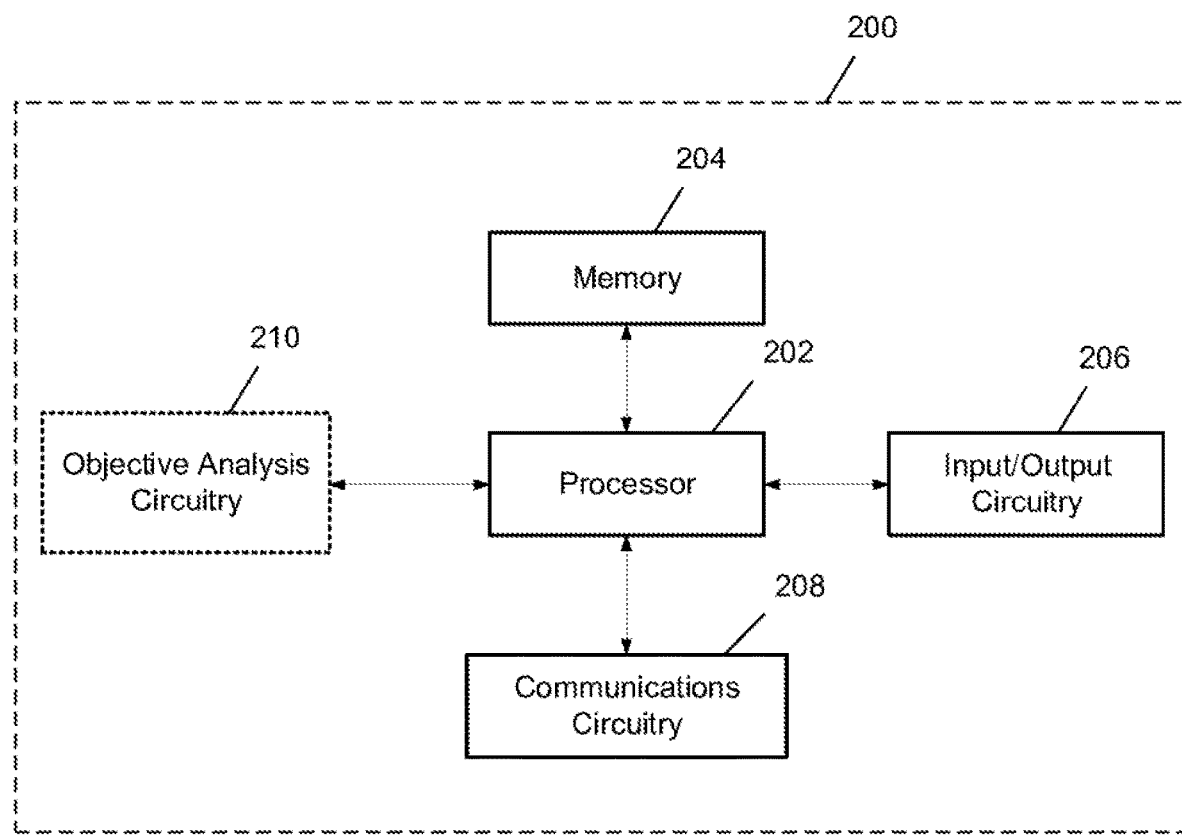
Figure 3B:
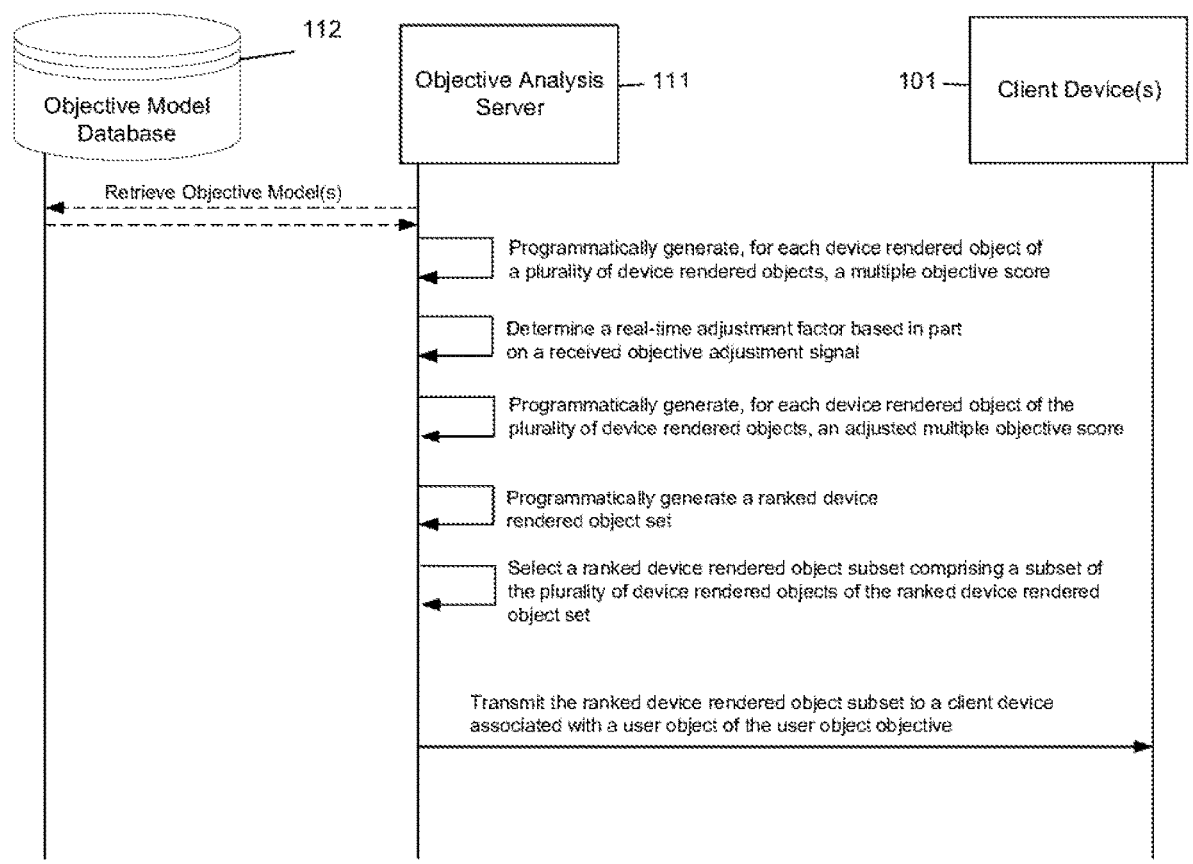
Figure 4:
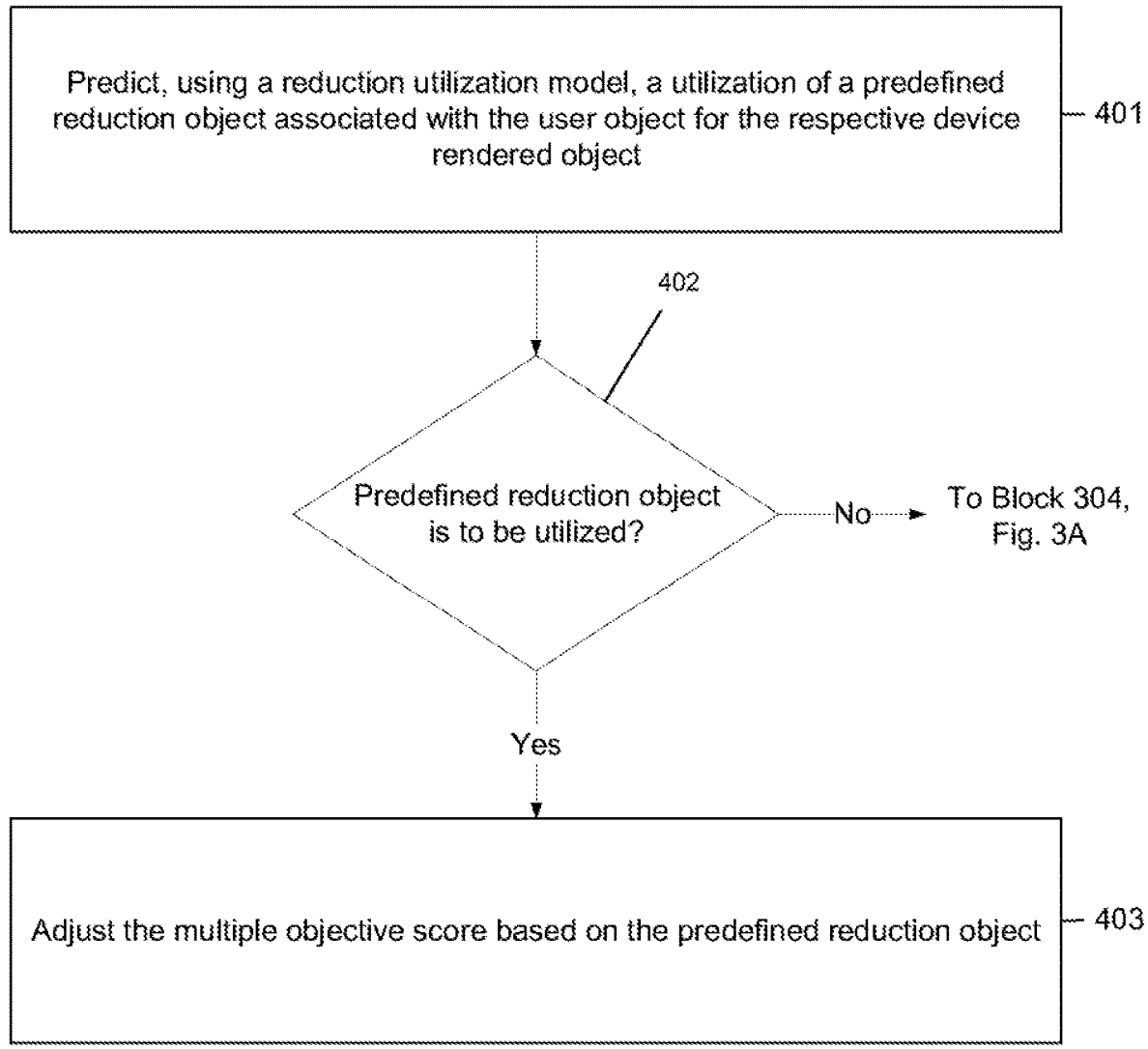

Having thus described the invention in general terms, reference will now be made to the accompanying drawings, which are not necessarily drawn to scale, and wherein:

FIG. 1 is an exemplary system architecture diagram of a system configured to practice embodiments of the present disclosure;

FIG. 2 is an exemplary schematic diagram of a computing entity according to one embodiment of the present disclosure;

FIG. 3A a flow diagram of a process for generating a ranked device rendered object set in accordance with one embodiment of the present disclosure;

FIG. 3B is a signal diagram of an example data flow in accordance with one embodiment of the present disclosure; and FIG. 4 a flow diagram of a process for predicting a utilization of a predefined reduction object in accordance with one embodiment of the present disclosure

DETAILED DESCRIPTION

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may, be included in at least one embodiment of the present disclosure, and may be included in more than one embodiment of the present disclosure (importantly, such phrases do not necessarily refer to the same embodiment).

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further. Where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "obtain" may refer to electronic retrieval (e.g., from local or remote memory or other storage such as a repository, and the like). The term "obtain" may refer to electronic receipt (e.g., receiving via a local communication bus, receiving from a remote computing device or repository via a communication network, and the like).

The term "user" should be understood to refer to an individual, group of individuals, business, organization, and the like. The users referred to herein may access a device rendered object service using client devices (as defined herein).

The term "device rendered object" may be used to refer to a set of executable instructions that, when executed by a processor of a computing device, renders an object for display. An example of a device rendered object can be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

As used herein, the term "device rendered object service" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an. Object, participate in redemption, generate rewards, provide a point of sale device or service, issue payments to providers and/or otherwise participate in the exchange of goods, services or experiences for currency, value and/or the like.

The term "device rendered object interaction" refers to electronic interaction with a device rendered object by a client device. In some examples, the device rendered object interaction may take the form of an accessing or selection of the device rendered object, a viewing of the device rendered object on an electronic display, a scrolling over the device rendered object, a retrieval of the device rendered object, a purchase transaction completed for the device rendered object, and/or the like.

In some embodiments, the interaction data (e.g., device rendered object interaction data) may include various other interactions, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "stakeholder device" refers to computer hardware and/or software that is configured to access a service made available by a server. The server is often (hut not always) on another computer system, in which case the stakeholder device accesses the service by way of a network. Stakeholder devices may include, without limitation, smart phones, tablet computers, laptop computers, wearables, personal computers, enterprise computers, and the like. In some examples, a stakeholder device may be associated with a stakeholder. As used herein, the terms "stakeholder," "provider," and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. For example, stakeholder may market a product or service via the device rendered object service.

The term "interaction signal" refers to electronic indication that an interaction (e.g., a view, purchase, click, or the like) has occurred with respect to a particular device rendered object. In some examples, an interaction signal may comprise timestamp data indicative of a time and/or date which the interaction occurred.

The term "user object" may refer to a data structure comprising preferences, settings, configurations, client device identifiers, a user identifier, data, and/or information associated with a specific user. The term "user identifier" refers to one or more items of data by which a user and this user's corresponding user object may be identified. For example, a user identifier may comprise ASCII text, a pointer, a memory address, or other unique identifier.

As used herein, the terms "user," "client," "consumer," and "customer" may be used interchangeably to refer, without limitation, to a client, customer, purchaser, shopper, user and the like who may be using a client device to receive and interact with a device rendered object. A user object may refer therefore to the explicit digital representation of a person's identity and other data or information associated with the user. In some embodiments, a user object can be used to store a description of characteristics of the user and/or of the client device, as well as credentials, past behaviors (e.g., historical data), and preferences of the user. For example, a user object may store a user object data record. A user object data record may refer to a data structure comprising an indication of an interaction signal status.

An "interaction signal status" may comprise a data structure having data that defines a particular status for the user object based on historical interactions with one or more device rendered objects or the like.

The term "objective" may refer to a desired outcome or achievement associated with a particular user or stakeholder, such as a business, merchant, consumer and/or the like. For example, an objective of a stakeholder such as a merchant may comprise an objective such as an increase or maximization in received electronic currency data values for a stakeholder device associated with a particular device rendered object. As another example, an objective of a user may comprise a financial benefit as well, such as a minimization of electronic currency data values transferred to a stakeholder device for an interaction, such as a transaction, associated with a device rendered object. Types of objectives may include, but are not limited to, a user object objective, a transaction object objective, a user object transformation objective, and a device rendered object currency value objective.

The term "objective score" may refer to a quantifiable value representative of an objective as described above, such as an objective associated with a particular user or stakeholder, such as a business, merchant, and/or the like. For example, an objective score may be associated with one or more of a user object objective, a transaction object objective, a user object transformation objective, and a device rendered object currency value objective. An objective score may be predicted, determined and/or otherwise generated using a unique objective model.

The term "user object objective" may refer to a desired outcome or achievement associated with a particular user object and at least one device rendered object. For example, a user object objective may comprise an occurrence of an interaction, purchase, or the like of a device rendered object by the user object.

The term "user object objective score" may refer to a quantifiable value or score representative of a user object objective, such as a predicted estimation or likelihood that a transaction will be conducted for a user object with a particular device rendered object. A user object objective score may be predicted, determined and/or otherwise generated using a unique objective model.

A "transaction object" may refer to a particular data structure that is associated with a device rendered object and comprises metadata associated with electronic currency data of a device rendered object and other data of the device rendered object. A transaction refers to a particular type of interaction associated with a device rendered object and a user object that occurs and results in a transfer of electronic currency data values from the user object to a stakeholder device associated with the device rendered object. A currency value data structure at a stakeholder device may change in response to the transaction occurring an increase in electronic currency data values in the currency value data structure associated with the stakeholder), as would a currency value data structure associated with the client device (e.g., a decrease in electronic currency data values in the currency value data structure associated with the client device).

The term "transaction object objective" may refer to a desired outcome or achievement associated with a particular transaction object. For example, a transaction object objective may be an objective of a stakeholder such as a merchant or the like for accurately associating an electronic currency value with a transaction object.

The term "transaction object objective score" may refer to a quantifiable value or score representative of a predicted estimation of an electronic currency value associated with a transaction object that is associated with a particular device rendered object. In some examples, the predicted electronic currency value may comprise a predicted booking value for the device rendered object. A transaction object objective score may be predicted, determined and/or otherwise generated using a unique objective model.

The term "device rendered object currency value objective" may refer to a desired outcome or achievement associated with a particular device rendered object. For example, a device rendered object currency value objective may comprise an operational monetary value of a device rendered object.

A "device rendered object currency value objective score" may refer to a data value or score representative of a predicted estimation of how high of a contribution the device rendered object makes toward one or more goals of a stakeholder. For example, this may be based on electronic currency values associated with the device rendered object. A device rendered object currency value objective score may be predicted, determined and/or otherwise generated using a unique objective model.

The term "user object transformation objective" may refer to a desired outcome or achievement associated with an interaction signal status of a user object. For example, a user object transformation objective may comprise a shift or transition from a first interaction signal status to a second interaction signal status. In this regard, an upward shift or transition to another status may comprise an increased amount of interaction signals generated between a user object and one or more device rendered objects. For example, a user object transformation objective may be an objective of a device rendered object service.

A "user object transformation objective score" may refer to a quantifiable value or score representative of a user object transformation objective. A user object transformation objective score may be predicted, determined and/or otherwise generated using a unique objective model. A user object transformation objective score may also be utilized in determining a weighting of one or more objective scores in determining a multiple objective score.

The term "multiple objective score" may refer to a quantifiable value or score that is applied to a device rendered object and that is determined based on a plurality of objectives associated with one or more stakeholders, users, or the like for the particular device rendered object. For example, a multiple objective score may be determined based on a weighting of one or more objective scores generated using a plurality of unique objective models. In some examples, a multiple objective score for a device rendered object may be adjusted based at least in part on the multiple objective score and a real-time adjustment factor. In this regard, an "adjusted multiple objective score" may refer to a multiple objective score that has been adjusted by one or more real-time adjustment factors.

The term "real-time adjustment factor" may refer to a quantifiable value associated with particular goal or other factor for a user object and/or device rendered object. For example, a goal for a user object and/or a device rendered object may be defined by a merchant, business, service (e.g., an intermediary service between stakeholders and users, such as a device rendered object service), or the like. As one example, a real-time adjustment factor may be associated with a goal such as an increase in electronic currency values generated based in part on interaction signals associated with one or more device rendered objects received from a plurality of client devices. "Electronic currency value" refer to data structures comprising electronic currency data values generated after a transaction between a device rendered object and a user object and received (and stored in an electronic currency data value structure) by a device rendered object service and/or a stakeholder device associated with the device rendered object. In this regard, the goal may include an increase or maximization of electronic currency data values gained from device rendered object interactions by one or more user objects. As another example, a real-time adjustment factor may be associated with a goal such as an increase in interaction signals associated with a given device rendered object, the interaction signals received via a client device. In this regard, the goal may be more overall interactions with a particular device rendered object by one or more user objects. In some embodiments, a real-time adjustment factor may be associated with a predicted utilization of a predefined reduction object.

The term "predefined reduction object" may refer to a data structure comprising information related to a reduction in electronic currency data values to be applied to one or more transactions between one or more device rendered objects and one or more user objects. As an example, a reduction may be a reduction in electronic currency data values transferred from a client device to a stakeholder device for one or more device rendered objects. In this regard, the predefined reduction object may comprise a predefined code or the like to be applied to one or more device rendered objects in order to reduce an amount of electronic currency data values transferred by a client device for the device rendered object. In some embodiments, a predefined reduction object may comprise an "open reduction object," which refers to a reduction that is accessible to all user objects interacting with a particular device rendered object. In this regard, any user object interacting with a device rendered object associated with an open reduction object may apply or otherwise utilize the reduction associated with the open reduction object for a transaction with the device rendered object. In other embodiments, a predefined reduction object may comprise a "closed reduction object," which refers to a reduction that is accessible to only certain user objects of a plurality of user objects that may interact with the particular device rendered object and/or device rendered object service. For example, certain user objects may receive or otherwise have access to closed reduction objects for a device rendered object based on historical interaction data with the particular device rendered object. In another similar example, certain user objects may receive or otherwise have access to closed reduction objects for a device rendered object due to lacking a predefined amount of historical interaction data with the particular device rendered object.

A real-time adjustment factor may be determined based upon a received objective adjustment signal. An "objective adjustment signal" may refer to a data structure or the like comprising data indicative of one or more goals that may impact a determination of a real-time adjustment factor and a subsequent determination of an adjusted multiple objective score. In some examples, an objective adjustment signal may be received by an objective analysis server (e.g., via a communications network) from a device rendered object service or another external third party.

As used herein, the term "likelihood" refers to a measure of probability for occurrence of a particular event. For example, the likelihood that a client device will interact with a device rendered object may be a value associated with a specific scale. In some implementations, the predictions discussed above such as the objective scores are based, at least in part, on the "likelihood" that an event will occur.

The term "machine-learning model" refers to a machine-learning task. Machine-learning is a method used to devise complex models and algorithms that lend themselves to prediction. A machine-learning model is a computer-implemented algorithm that can learn from data without relying on rules-based programming. These models enable reliable, repeatable decisions and results and uncovering of hidden insights through machine-based learning from historical relationships and trends in the data.

A machine-learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training, dataset while tuning the model's hyperparameters (e.g. the number of hidden units in a neural network). In some embodiments, the machine-learning model is a regression model.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

The term "objective model" refers to a collection of one or more data items that indicate one or more predictive operations configured to be performed on an input in order to determine a model-specific objective score. Examples of predictive models include regression models, Bayesian inference models, neural network models, machine learning models, gradient boosted machine learning models, etc. Examples of data items characterizing a particular objective model include data items associated with parameters of the objective model, data items indicating a meta-structure (e.g., number of layers) of the particular objective model, data indicating particular operations (e.g., particular on-linear operations) associated with the particular objective model, etc.

The term "reduction utilization model" refers to a collection of one or more data items that indicate one or more predictive operations configured to be performed on an input in order to predict a utilization of a predefined reduction object by particular user object. An example of a reduction utilization model may include a gradient boosted machine learning model, a type of machine learning model that utilizes gradient boosting. Examples of data items characterizing a particular reduction utilization model include data items associated with parameters of the reduction utilization model, data items indicating a meta-structure (e.g., number of layers) of the particular objective model, data indicating particular operations (e.g., particular non-linear operations) associated with the particular objective model, etc. For example, a reduction utilization model may utilize a plurality of historical data associated with a user object in order to predict the utilization of a predefined reduction object, Gradient boosting is a machine learning technique for regression and classification problems which produces a prediction model in the form of an ensemble of weak prediction models, typically decision trees. It builds the model in a stage-wise fashion like other boosting methods do, and it generalizes them by allowing optimization of an arbitrary differentiable loss function. For example, gradient boosting combines weak learners into a single strong learner in an iterative fashion. Gradient boosting tends to aggressively exploit any opportunity to improve predictive accuracy, to the detriment of clarity of interpretation (or, indeed, the feasibility of any interpretation whatsoever).

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Overview

The determination of device rendered objects to be included in a device rendered object set for a user object to be transmitted to a particular client device, and moreover, how and in what manner to present the device rendered object set may be difficult to determine in situations in which multiple stakeholders have an interest in the device rendered objects. For example, as described above, a device rendered object service may be operable to provide device rendered object services on behalf of one or more stakeholders (e.g., merchants) that are offering one or more instruments that are redeemable for goods, services, experiences and/or the like. In this regard, a device rendered object service may serve as an intermediary between a stakeholder and a user, such as a customer/consumer or the like.

As such, a device rendered object service may need to ensure both user satisfaction and stakeholder satisfaction with respect to device rendered object sets, while also ensuring that objectives and/or other needs of the device rendered object service are met as well.

To do so, various embodiments discussed herein may determine, through use of a plurality of unique objective models, quantifiable values in the form of objective scores for one or more objectives associated with the device rendered object service, one or more stakeholders, and/or one or more users. In this regard, objective scores may be weighted to determine a multiple objective score for a particular device rendered object. For example, the multiple objective score for the particular device rendered object may be unique to a particular user object.

Further, real-time adjustments to the determined multiple objective score may be performed based on a received objective adjustment signal. In this regard, the received objective adjustment signal may be associated with one or more goals of the device rendered service for the particular user object. As one non-limiting example, an example goal for a particular user object may be an increase in interaction signals with a particular device rendered object or more generally with the device rendered object service itself by client devices. In this regard, interactions with device rendered objects may be desired to avoid wasting memory resources for storage of device rendered objects that are not being interacted with.

Additionally, embodiments discussed herein may determine a ranked device rendered object set for a particular user object. The ranked device rendered object set, in some embodiments, may be ranked in accordance with multiple objective scores of each device rendered object in the device rendered object set. Embodiments herein may also select a subset of the ranked device rendered object set based on a predefined size of a user interface area of a client device on which the ranked device rendered object subset is to be rendered for display. In this regard, a user interface of a client device may have limited space in which to display one or more device rendered objects and bandwidth may be conserved by only transmitting a subset in accordance with the space available to the user interface.

Embodiments herein provide a more efficient means for determining relevant and/or recommended device rendered objects for user objects by incorporating objectives and other needs of not only users, but stakeholders (e.g., merchants) and device rendered object service(s) as well. Additionally, embodiments herein may determine a subset of ranked device rendered objects to be presented based on a limited space within a user interface of a client device for a particular user object. In this regard, users may be presented with ranked device rendered object sets, eliminating additional data processing over a communication network in instances in which users) would need to manually seek out device rendered objects of the device rendered object set.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present disclosure may operate. The architecture 100 includes one or more client devices, such as a client device 101, and one or more stakeholder devices, such as stakeholder device 104, that interact with an objective scoring system 102 over a communication network 103 to transmit various data. For example, the objective scoring system 102 may determine a multiple objective score for each of a plurality of device rendered objects based on interaction signals and/or other data received from client device(s) 101 and/or stakeholder device(s) 104. The objective scoring system 102 may then transmit a generated ranked device rendered object subset to the client device 101. In some embodiments, the objective scoring system 102 may be associated with a device rendered object service.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 103 may include a cellular telephone, a 902.11, 902.16, 902.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the predictive analysis server 111. In one embodiment, the protocol is a custom protocol of JSON objects sent via a Websocket channel. In one embodiment, the protocol is JSON over RPC, JSON over REST/HTTP, and the like.

A client device 101 and/or stakeholder device 104 may be any computing device as defined herein. Electronic data received by the objective analysis server 111 from the client device(s) 101 and/or stakeholder device(s) 1.04 may be provided in various forms and via various methods. For example, the client device(s) 101 and stakeholder device(s) 104 may include desktop computers, laptop computers, smartphones, netbooks, tablet computers, wearables, and the like. An example architecture for a client device 101, stakeholder device 104, and/or objective analysis server 111 is depicted in the apparatus 200 of FIG. 2.

In embodiments where a client device 101 or stakeholder device 104 is a mobile device, such as a smart phone or tablet, the client device 101 or stakeholder device 104 may execute an "app" to interact with the objective analysis server 111. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client device(s) 101 and/or stakeholder device(s) 104 may interact with the objective analysis server 111 via a web browser. As yet another example, the client device(s) 101 and/or stakeholder device(s) 104 may include various hardware or firmware designed to interface with the objective analysis server 111.

The objective analysis system 102 may include an objective analysis server 111 and an objective model repository 112. The objective analysis server 111 may be configured to perform analysis tasks (e.g., objective score and/or multiple objective score determinations) using multiple objective models, where each objective model is uniquely characterized by one or more parameters, and generate outputs such as a ranked device rendered object set or subset thereof. The objective model repository 112 is configured to store parameters characterizing the multiple objective models as well as at least one reduction utilization model. For example, the predictive model repository 112 may store weights and/or biases characterizing one or more machine learning models, one or more machine learning models that employ gradient boosting, etc.

The objective analysis server 111 may be embodied as a computer or computers. An example architecture for the objective analysis server 111 is depicted in the apparatus 200 of FIG. 2. The Objective analysis server 111 may provide for sending electronic data and/or receiving electronic data from various sources, including but not limited to the client device(s) 101 and stakeholder devices 104. For example, the objective analysis server 111 may receive data, such as interaction signals, user objects, and/or the like from a client device(s) 101 and/or stakeholder device(s) 104 and transmit data such as ranked device rendered object sets or subsets to the client device(s) 101. In some embodiments, the objective analysis server 111 may be configured to perform, cross-model multiple objective score generation using a plurality of unique objective models, ranked device rendered object set generation, and other associated tasks as timber described herein.

An example architecture for the objective analysis server 111, client device(s) 101 and/or stakeholder device(s) 104 is depicted in the apparatus 200 of FIG. 2. As depicted in FIG. 2, the apparatus 200 includes processor 202, memory 204, input/output circuitry 206, communications circuitry 208, and may include objective analysis circuitry 210 in embodiments in which the apparatus 200 is embodied by the objective analysis server 111. The apparatus 200 may be configured to execute the operations described herein with respect to FIGS. 3A-4B. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In one embodiment, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

As an example, the processor 202 may be configured to maintain one or more communication channels connecting a plurality of client devices 101 and/or stakeholder devices 104 to enable message sharing/dissemination therebetween. The processor 202 ensures that messages intended for exchange between the client devices 101 and/or stakeholder devices 104 within the particular communication channel are properly disseminated to those client devices 101 and/or stakeholder devices 104 for display within respective display windows provided via the client devices 101 and/or stakeholder devices 104.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 101 and/or stakeholder devices 104.

In one embodiment, the apparatus 200 may include input/output circuitry 206 that may, in turn, be in communication with processor 202 to provide output to a device, such as a client device 101, stakeholder device 104, and/or objective analysis server 111 and, in one embodiment, to receive an indication of a user input. The input/output circuitry 206 may comprise a user interface and may include a display, and may comprise a web user interface, a mobile application, a client computing device, a kiosk, and/or the like. In one embodiment, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network.

For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna antennae or to handle receipt of signals received via the antenna/antennae.

In some embodiments in which the apparatus 200 is embodied by the objective analysis server 111, the apparatus may include objective analysis circuitry 210. Objective analysis circuitry 210 includes hardware configured to execute operations configured to perform cross-model objective score generation, and multiple objective score generation, ranked device rendered object set and subset generation, predetermined reduction object utilization prediction, adjusted multiple objective score generation, and other associated processes as further described below. The objective analysis circuitry 210 may utilize processing circuitry, such as the processor 202, to perform these actions. However, it should also be appreciated that, in one embodiment, the objective analysis circuitry 210 may include a separate processor, specially configured Field Programmable Gate Array (FPGA), or Application Specific Integrated Circuit (ASIC) or performing the functions described herein. The objective analysis circuitry 210 may be implemented using, hardware components of the apparatus configured by either hardware or software for implementing these functions.

It is also noted that all or some of the information discussed herein can be based on data that is received, generated and/or maintained by one or more components of apparatus 200. In one embodiment, one or more external systems (such as a remote cloud computing and/or data storage system) may also be leveraged to provide at least some of the functionality discussed herein.

The term "circuitry" should be understood broadly to include hardware and, in one embodiment, software for configuring the hardware. With respect to components of apparatus 200, the term "circuitry" as used herein should therefore be understood to include particular hardware configured to perform the functions associated with the particular circuitry as described herein. For example, in one embodiment, "circuitry" may include processing circuitry, storage media, network interfaces, input/output devices, and the like. In one embodiment, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of an objective analysis server 111 may include one or more databases (other than objective model database 112) configured for storing and/or indexing objective models associated with the objective analysis server 111.

Example Data Flows of Embodiments of the Present Disclosure

FIG. 3A is an example flow diagram illustrating performing multiple objective score determinations, adjusted multiple objective score determinations, and generation of a ranked device rendered object set. The process 300 illustrated in FIG. 3A is described herein as being performed by an objective analysis server, such as the objective analysis server 111 of FIG. 1, but can be performed by any system of one or more computers, such as a system that includes the objective analysis server 111 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 3A may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

Generation of a Multiple Objective Score

As depicted in FIG. 3A, the process 300 starts at block 301 wherein the apparatus 200 programmatically generates, via objective analysis circuitry 210, processor 202, memory 204, and/or the like, for each device rendered object of a plurality of device rendered objects, a multiple objective score.

In some embodiments, a multiple objective score for a device rendered object may be generated based at least in part on weighting each score of a plurality of objective scores. In this regard, the apparatus 200 may be configured to, via objective analysis circuitry 210, processor 202, memory 204, and/or the like, generate a plurality of objective scores for a particular device rendered object.

As described above, an objective score may comprise a quantifiable value representative of an objective associated with a particular stakeholder, user, or the like. In some embodiments, each objective score for a device rendered object may be generated using a unique objective model tailored to and trained based on the respective objective. The plurality of objectives for a particular device rendered object may include at least a user object objective, a transaction object objective, and a device rendered object currency value objective. In some embodiments, the plurality of objectives may additionally include a user object transformation objective.

In embodiments, the apparatus 200 may be configured, via processor 202, object analysis circuitry 210, or the like, to select an objective model for determining a particular objective score. In this regard, the apparatus 200 may retrieve the selected objective model from objective model repository 112, e.g., via communications circuitry 208, in order to utilize the model for generating an objective score.

For example, a user object objective score may be generated using, an objective model stored in objective model repository 112 that is unique to estimating and/or predicting a likelihood that a transaction will occur between a user object and a device rendered object. In this regard, the unique objective model used for generating a user object objective score may be trained using a training dataset comprising data associated with one or more user objects and one or more device rendered objects. For example, the data associated with one or more user objects may comprise user data such as demographic data, historical interaction data such as previous transactions and/or other interactions with one or more device rendered objects, and/or the like. The data associated with one or more device rendered objects may include historical data regarding the one or more device rendered objects, such as, for example, interaction data, view and/or transaction frequency, electronic currency value history data for a plurality of historical transactions associated with the device rendered objects, and/or the like. The data associated with one or more device rendered objects may also include data regarding an expiration of the device rendered object (e.g., how long a device rendered object is made available for interactions), data associated with a stakeholder that is associated with the device rendered object, etc.

In this regard, for each of a plurality of device rendered objects, data associated with the respective device rendered object and a particular user object may be provided by the apparatus 200 as input to the unique objective model in order to determine a user object objective score.

A transaction object objective score may be generated using an objective model stored in objective model repository 112 that is unique to estimating and/or predicting an accurate association of an electronic currency value with a transaction object of the particular device rendered object.

In this regard, the unique objective model used for generating a transaction object objective score may be trained using a training dataset comprising data associated with one or more user objects and one or more device rendered objects, including one or more transaction objects. For example, the data associated with one or more user objects may comprise user data such as demographic data, historical data such as previous transactions or interactions with one or more device rendered objects, and/or the like. The data associated with one or more device rendered objects may include historical data regarding the one or more device rendered objects, such as, for example, view and/or transaction frequency, electronic currency value history data. The data, associated with one or more device rendered objects may also include data regarding, an expiration of the device rendered object, data associated with a stakeholder or the like that is associated with the device rendered object, etc. Additional data associated with transaction objects, such as electronic currency data used in determination of an estimated association of an electronic currency value, is also used to train the unique model for generating a transaction object objective score.

For example, for each of a plurality of device rendered objects, data associated with a transaction object of the respective device rendered object as well as a user object objective score may be provided by the apparatus 200 as input to the unique objective model in order to determine a user object objective score. In this regard, the output of the unique objective model used for generating the user object objective score may be used as input to the unique objective model used for determining the transaction object objective score. 100971 in some embodiments, the apparatus 200 may be configured to adjust the generated transaction object objective score for a particular device rendered object in instances in which an electronic currency data value associated with the particular device rendered object exceeds a predefined threshold. For example, the apparatus 200 may be configured to determine, via objective analysis circuitry 210, processor 202, and/or the like, whether data associated with device rendered object meets or exceeds a predefined threshold value. For example, the predefined threshold value may be a predefined electronic currency data value that, if met or exceeded by a price of a device rendered object, indicates that the transaction object objective score of the device rendered object should be adjusted to reduce an overpowering effect on a multiple objective score (and, consequently, an overpowering effect on the generation of a ranked device rendered object set, discussed further below). In some embodiments, the transaction object objective score may be adjusted using a predefined value as an exponent in the determination of an adjusted transaction object objective score.

In addition to a user object objective score and a transaction object objective score discussed above, a device rendered object currency value objective score may also be generated in order to generate a multiple objective score. A device rendered object currency value score may be generated using an objective model stored in objective model repository 112 that is unique to estimating and/or predicting how high of a contribution the device rendered object makes toward one or more goals of a stakeholder.

In this regard, the unique objective model used for generating a device rendered object currency value objective score may be trained using a training dataset comprising data associated with one or more user objects associated with one or more stakeholders and one or more device rendered objects. For example, the data associated with one or more user objects associated with one or more stakeholders may comprise data such as demographic data, historical data such as previous offerings, electronic currency data values, and/or the like with one or more associated device rendered objects, and/or the like. The data associated with one or more device rendered objects may include historical data regarding the one or more device rendered objects, such as, for example, interaction and/or transaction frequency, electronic currency data value history data. In this regard the data associated with one or more device rendered objects and one or more stakeholder user objects may indicate which device rendered objects contribute more heavily to goals associated with the stakeholder relative to other device rendered objects. Additionally, transaction object data may also be used to train the unique objective model.

For example, for each of a plurality of device rendered objects, data associated with a stakeholder of the respective device rendered object as well as a user object objective score may be provided by the apparatus 200 as input to the unique objective model in order to determine a user object objective score. In this regard, the output of the unique objective model used for generating the user object objective score may be used as input to the unique objective model used for determining the transaction object objective score.

In some embodiments, in addition to a user object objective score, transaction object objective score, and a device rendered object as discussed above, a user object transformation objective score may also be generated in order to generate a multiple objective score. A user object transformation objective may be associated with transforming a user object data record associated with a user data object from a first interaction signal status to a second interaction signal status. In this regard, a user object transformation objective may be an objective of the device rendered object service.

For example, each user object interacting with the device rendered object service may comprise a user object data record comprising data indicative of an interaction signal status for the user object, in this regard, the apparatus 200 may be configured to, via objective analysis circuitry 210, processor 202, memory 204, and/or the like, determine an interaction signal status for one or more user objects.

For example, a user object comprising historical data indicative of few or no interaction signals with device rendered objects of the device rendered object service may comprise an interaction signal status indicative that the user associated with the user object is a new user to the device rendered object service (e.g., the user has not interacted with any device rendered objects via the device rendered object service).

As another example, a user object comprising historical data indicative of one or more interaction signals with device rendered objects of the device rendered object service but has not interacted with device rendered objects for a predefined period of time (e.g., based on timestamp data of the interaction signals) may comprise an interaction signal status indicative that the user associated with the user object is a lapsed user (e.g., a user who once but no longer interacts with device rendered objects and/or utilizes the device rendered object service).

As yet another example, a user object comprising, historical data indicative of one or more interaction signals with device rendered objects of the device rendered object service having timestamps with large gaps of time between interaction signals (e.g., based on timestamp data of the interaction signals) may comprise an interaction signal status indicative that the user associated with the user object is an infrequent user (e.g., a user who interacts with device rendered objects infrequently, such as once every few months).

As a further example, a user object comprising historical data indicative of one or more interaction signals with device rendered objects of the device rendered object service having timestamps with small gaps of time between interaction signals as well as recent timestamps (e.g., based on timestamp data of the interaction signals) may comprise an interaction signal status indicative that the user associated with the user object is a frequent user of the device rendered object service (e.g., a user who interacts with device rendered objects frequently, such as, for example, once a day).

In this regard, an objective of a device rendered object service may be to transform a user object data record associated with a user data object from a first interaction signal status to a second interaction signal status. For example, an objective the device rendered object service may be to transform a new or lapsed user into at least an infrequent user. As another example, an objective the device rendered object service may be to transform a new or infrequent user into a frequent user.

A user object transformation objective score may be generated using an objective model stored in objective model repository 112 that is unique to estimating and/or predicting one or more device rendered objects that would cause interaction signals to be generated with a user object based on an interaction signal status of the user object. In other words, the objective model may predict which device rendered objects would entice a particular user object to interact with the device rendered object service in order to transform a user object data record associated with the user object from a first interaction signal status to a second interaction signal status in this regard, the unique objective model used for generating a user object transformation objective score may be trained using a training dataset comprising data associated with at least one or more user objects and one or more device rendered objects, as well as a plurality of historical interaction signal status data for a plurality of user objects. For example, the data associated with one or more user objects may comprise data such as demographic data, historical data such as previous electronic currency data values, and/or the like with one or more associated device rendered objects, and/or the like. The data associated with one or more device rendered objects may include historical data regarding the one or more device rendered objects, such as, for example, view and/or transaction frequency, and/or electronic currency data value history data. Further, the historical interaction signal status data for the plurality of user objects may be analyzed to determine interactions with particular device rendered objects that transformed interaction signal statuses of other user data objects to a second interaction signal status.

The plurality of objective scores for a device rendered object, as described above, may be generated and then weighted to generate a multiple objective score for the device rendered object.

The plurality of objective scores for a device rendered object may be weighted in multiple ways. For example, the scores may be weighted using constant values representing a relative importance to one or more of the user, stakeholder(s), or the device rendered object service. For example, when determining a multiple objective score for each of a plurality of device rendered objects for a user object comprising an interaction signal status indicative of a new user, a heavier weight (e.g., a larger constant value) may be allocated to the user data object score (e.g., the primary objective is to increase transactions with device rendered objects).

Once a multiple objective score is determined for each of a plurality of device rendered objects for a particular user object, a real-time adjustment factor may be determined in order to adjust one or more of the multiple objective scores.

As shown in at block 302, the apparatus 200 determines, via objective analysis circuitry 210, processor 202, memory 204, communications circuitry 208, and/or the like, a real-time adjustment factor based in part on a received objective adjustment signal. In some embodiments, the objective adjustment signal may be received from a device rendered object service.

As described above, an objective adjustment signal may, comprise data indicative of one or more goals for consideration in the determination of a real-time adjustment factor and a subsequent determination of an adjusted multiple objective score. For example, the one or more goals may be associated with goals of a device rendered object service. In some embodiments, the one or more goals may be goals that are sought to be achieved not only for one user object but for a plurality or all user objects that interact with the device rendered object service. As one example, one goal may be to increase interaction signals with associated with a given device rendered object. In other words, the goal may be for more overall interaction (e.g., views, clicks, transactions, or the like) with a particular device rendered object. In this regard, the real-time adjustment factor that is determined may be associated with an increase in interaction signals (received via client device(s) 101) associated with a given device rendered object.

As another example, another goal may be an increase in electronic currency values generated based in part on interaction signals associated with one or more device rendered objects received from a plurality of client devices. In other words, the goal may be for more transactions of a particular device rendered object. In this regard, the real-time adjustment factor that is determined may be associated with an increase in electronic currency data values in an electronic currency data structure for a stakeholder and/or the device rendered object service associated with a given device rendered object.

In some embodiments, determining a real-time adjustment factor in order to adjust a multiple objective score for a particular device rendered object may comprise determining whether a predefined reduction object may be utilized by a particular user object for the device rendered object. Turning briefly to FIG. 4A, a process for predicting a utilization of a predefined reduction object is illustrated.

As shown in block 401, the apparatus 200 predicts, e.g., via objective analysis circuitry 210, processor 202, memory 204, and/or the like, using a reduction utilization model, a utilization of a predefined reduction object associated with the user object for the respective device rendered object.

For example, as described above, a reduction utilization model may be a unique model configured to determine utilizations of one or more predefined reduction objects for a plurality of user objects. In this regard, a reduction utilization model may be trained based at least on historical interaction data of one or more user objects. For example, the historical purchase data may comprise data indicative that a predefined reduction object has been utilized for one or more previous transactions of device rendered objects by the user object. The apparatus 200 may provide a user object and a device rendered object as input to the reduction utilization model in order to predict whether the provided user object would utilized a predefined reduction object in a transaction with the device rendered object.

As described above, a predefined reduction object may be an open reduction object available to all user objects interacting with a particular device rendered object. In some embodiments, the predefined reduction object may be a closed reduction object available only certain user objects of a plurality of user objects that may interact with the particular device rendered object.

At block 402, a decision point is reached wherein the apparatus 200 determines whether the predefined reduction object is to be utilized in the adjustment of the multiple objective score. 0.1n accordance with a determination that a transaction between the device rendered object and the user object would include utilization of a predefined reduction object, the process continues to block 403.

At block 403, the apparatus adjusts the multiple objective score based on the predefined reduction object. For example, in embodiments in which a predefined reduction object comprises a code indicating a reduced amount electronic currency data values to be transferred from an electronic currency data structure associated with the user object, the apparatus may adjust the multiple object score by reducing the multiple objective score based on the reduction in electronic currency data values. The process may then continue back to block 303 of FIG. 3A. Additionally, in accordance with a determination that a transaction between the device rendered object and the user object would not include utilization of a predefined reduction object, the process continues back to block 303 of FIG. 3A, in which the apparatus 200 programmatically generates, for each device rendered object of the plurality of device rendered objects, an adjusted multiple objective score. For example, the multiple objective score may be adjusted (e.g., increased or decreased) based on a determined real-time adjustment factor as described above. The generation of the adjusted multiple objective score may be based at least in part on the multiple objective score for the device rendered object and the real-time adjustment factor.

As shown in block 304, the apparatus 200 programmatically generates, via object analysis circuitry 210, processor 202, memory 204, and/or the like, a ranked device rendered object set comprising a plurality of device rendered objects in an order according to each associated adjusted multiple objective score of each device rendered object. In this regard, the ranked device rendered object set may be unique to a particular user object used in the determination of the plurality of objective scores and subsequent (adjusted) multiple objective scores of each of the device rendered objects in the ranked device rendered object set.

In some embodiments, the ranked device rendered object set may be ranked in an order according to each associated adjusted multiple objective score of each device rendered object. For example, a device rendered object having the highest adjusted multiple objective score may be ranked first in the ranked device rendered object set.

At block 305, the apparatus 200 selects a ranked device rendered object subset comprising a subset of the plurality of device rendered objects of the ranked device rendered object set. For example, in some embodiments, the ranked device rendered object subset is selected based at least on a predefined size of a user interface area of a client device associated with the a user object of the user object objective. In this regard, the apparatus 200 may be configured to receive data from one or more client devices 101 indicating the type of client device (e.g., phone, tablet, laptop, etc.) and associated attributes (e.g., screen size, memory, etc.). The amount of ranked device rendered objects in the ranked device rendered object subset may be determined based on the size of the user interface area available to the particular client device. For example, when screen space is limited, only the top three device rendered objects in the device rendered object set may be selected to be included in the ranked device rendered object subset.

At block 306, the apparatus 200 transmits, via communications circuitry 208, processor 202, and/or the like, the ranked device rendered object subset to a client device associated with a user object of the user object objective.

In this regard, a user of the client device is presented with a plurality of device rendered objects selected based on satisfying a plurality of objectives and goals associated with stakeholders of the device rendered objects as well as the device rendered object service.

FIG. 3B is a signal diagram of an example data flow represented by method 300. Method 300 is described as being performed by an objective model database 112, an objective analysis server 111, and one or more client devices 101, as described above with regards to FIG. 1.

Although example processing systems have been described in FIGS. 1-2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data. (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory-, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client computing device (e.g., for purposes of displaying information/data to and receiving user input from a user interacting with the client computing device). Information/data generated at the client computing device (e.g., a result of the user interaction) can be received from the client computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. An apparatus comprising at least one processor and at least one memory storing instructions that, with at least one processor, configure the apparatus to:
   programmatically generate, for each device rendered object of a plurality of device rendered objects, a multiple objective score based at least in part on weighting each score of a plurality of objective scores generated using a plurality of unique objective models each associated with a unique objective of a plurality of objectives, wherein the plurality of objectives comprises at least a user object objective, a transaction object objective, and a device rendered object currency value objective;
   determine a real-time adjustment factor based in part on a received objective adjustment signal, wherein the received objective adjustment signal comprises data indicative of a plurality of goals for each device rendered object;
   programmatically generate, for each device rendered object of the plurality of device rendered objects, an adjusted multiple objective score based at least in part on the multiple objective score for the device rendered object and the real-time adjustment factor, wherein generating the adjusted multiple objective score comprises:
     predicting, using a reduction utilization model, a utilization of a predefined reduction object associated with user objects for each device rendered object, wherein the predefined reduction object is associated with one of an open reduction object available to all user objects of a plurality of user objects or a closed reduction object available to a subset of user objects of the plurality of user objects, and
     in accordance with a predicted utilization of the predefined reduction object, adjusting the multiple objective score based on the predefined reduction object to generate the adjusted multiple objective score;
   programmatically generate a ranked device rendered object set comprising a plurality of device rendered objects in an order according to each associated adjusted multiple objective score of each device rendered object;
   select a ranked device rendered object subset comprising a subset of the plurality of device rendered objects of the ranked device rendered object set, wherein the ranked device rendered object subset is selected based at least on a predefined size of a user interface area of a client device associated with a user object of the user object objective; and
   transmit the ranked device rendered object subset to the client device associated with the user object of the user object objective, the ranked device rendered object subset configured for rendering within the user interface area of the client device.

2. The apparatus of claim 1, wherein the reduction utilization model comprises a gradient boosted model.

3. The apparatus of claim 1, wherein the instructions are further configured to, with the at least one processor, cause the apparatus to:
   train the reduction utilization model based at least on historical user data associated with the user object.

4. The apparatus of claim 1, wherein the real-time adjustment factor is associated with an increase in interaction signals associated with a given device rendered object, the interaction signals received from the client device.

5. The apparatus of claim 1, wherein the real-time adjustment factor is associated with an increase in electronic currency value data structures generated based in part on interaction signals associated with one or more device rendered objects received from a plurality of client devices.

6. The apparatus of claim 1, wherein the plurality of objectives further comprise a user object transformation objective associated with transforming a user object data record associated with a user object from a first interaction signal status to a second interaction signal status.

7. A computer program product including a non-transitory computer readable medium having program code portions stored thereon with the program code portions being configured, upon execution, to:
   programmatically generate, for each device rendered object of a plurality of device rendered objects, a multiple objective score based at least in part on weighting each score of a plurality of objective scores generated using a plurality of unique objective models each associated with a unique objective of a plurality of objectives, wherein the plurality of objectives comprises at least a user object objective, a transaction object objective, and a device rendered object currency value objective;
   determine a real-time adjustment factor based in part on a received objective adjustment signal, wherein the received objective adjustment signal comprises data indicative of a plurality of goals for each device rendered object;
   programmatically generate, for each device rendered object of the plurality of device rendered objects, an adjusted multiple objective score based at least in part on the multiple objective score for the device rendered object and the real-time adjustment factor, wherein generating the adjusted multiple objective score comprises:
     predicting, using a reduction utilization model, a utilization of a predefined reduction object associated with user objects for each device rendered object, wherein the predefined reduction object is associated with one of an open reduction object available to all user objects of a plurality of user objects or a closed reduction object available to a subset of user objects of the plurality of user objects, and
     in accordance with a predicted utilization of the predefined reduction object, adjusting the multiple objective score based on the predefined reduction object;

generate a ranked device rendered object set comprising a plurality of device rendered objects in an order according to each associated adjusted multiple objective score of each device rendered object;

select a ranked device rendered object subset comprising a subset of the plurality of device rendered objects of the ranked device rendered object set, wherein the ranked device rendered object subset is selected based at least on a predefined size of a user interface area of a client device associated with a user object of the user object objective; and transmit the ranked device rendered object subset to the client device associated with the user object of the user object objective, the ranked device rendered object subset configured for rendering within the user interface area of the client device.

8. The computer program product of claim 7, wherein the reduction utilization model comprises a Gradient Boosted Machine (GBM) machine learning model.

9. The computer program product of claim 7, wherein the program code portions are further configured to:
train the reduction utilization model based at least on a plurality of historical user data associated with the user object.

10. The computer program product of claim 7, wherein the real-time adjustment factor is associated with an increase in interaction signals associated with a given device rendered object, the interaction signals received via the client device.

11. The computer program product of claim 7, wherein the real-time adjustment factor is associated with an increase in electronic currency value data structures generated based in part on interaction signals associated with one or more device rendered objects received from a plurality of client devices.

12. The computer program product of claim 7, wherein the plurality of objectives further comprise a user object transformation objective associated with transforming a user object data record associated with a user object from a first interaction signal status to a second interaction signal status.

13. A computer-implemented method comprising:
programmatically generating, for each device rendered object of a plurality of device rendered objects, a multiple objective score based at least in part on weighting each score of a plurality of objective scores generated using a plurality of unique objective models each associated with a unique objective of a plurality of objectives, wherein the plurality of objectives comprises at least a user object objective, a transaction object objective, and a device rendered object currency value objective;

determining a real-time adjustment factor based in part on a received objective adjustment signal, wherein the received objective adjustment signal comprises data indicative of a plurality of goals for each device rendered object;

programmatically generating, for each device rendered object of the plurality of device rendered objects, an adjusted multiple objective score based at least in part on the multiple objective score for the device rendered object and the real-time adjustment factor, wherein generating the adjusted multiple objective score comprises:
predicting, using a reduction utilization model, a utilization of a predefined reduction object associated with user objects for each device rendered object, wherein the predefined reduction object is associated with one of an open reduction object available to all user objects of a plurality of user objects or a closed reduction object available to a subset of user objects of the plurality of user objects; and
in accordance with a predicted utilization of the predefined reduction object, adjusting the multiple objective score based on the predefined reduction object;

programmatically generating a ranked device rendered object set comprising a plurality of device rendered objects in an order according to each associated adjusted multiple objective score of each device rendered object;

selecting a ranked device rendered object subset comprising a subset of the plurality of device rendered objects of the ranked device rendered object set, wherein the ranked device rendered object subset is selected based at least on a predefined size of a user interface area of a client device associated with a user object of the user object objective; and transmitting the ranked device rendered object subset to the client device associated with the user object of the user object objective, the ranked device rendered object subset configured for rendering within the user interface area of the client device.

14. The computer-implemented method of claim 13, further comprising:
train the reduction utilization model based at least on a plurality of historical user data associated with the user object.

15. The computer-implemented method of claim 13, wherein the real-time adjustment factor is associated with an increase in interaction signals associated with a given device rendered object, the interaction signals received via the client device.

16. The computer-implemented method of claim 13, wherein the real-time adjustment factor is associated with an increase in electronic currency value data structures generated based in part on interaction signals associated with one or more device rendered objects received from a plurality of client devices.

17. The computer-implemented method of claim 13, wherein the plurality of objectives further comprise a user object transformation objective associated with transforming a user object data record associated with a user object from a first interaction signal status to a second interaction signal status.

* * * * *